United States Patent [19]

Davis

[11] Patent Number: 4,961,152
[45] Date of Patent: Oct. 2, 1990

[54] ADAPTIVE COMPUTING SYSTEM

[75] Inventor: Lawrence Davis, Cambridge, Mass.

[73] Assignee: Bolt Beranek and Newman Inc., Cambridge, Mass.

[21] Appl. No.: 205,154

[22] Filed: Jun. 10, 1988

[51] Int. Cl.$^5$ .................. G06F 15/18; G05B 13/00
[52] U.S. Cl. ..................................... 364/513; 364/274;
364/916; 364/972; 364/221.1; 364/200;
364/900
[58] Field of Search ................ 364/513, 200 MS File,
364/274, 221.1, 900 MS File, 916, 972; 382/14,
15; 365/49

[56] References Cited

U.S. PATENT DOCUMENTS 4,697,242  9/1987  Holland et al. ................ 364/513
4,821,333  4/1989  Gillies ............................ 382/41

OTHER PUBLICATIONS

"Classifier System Learning of a Boolean Function", Stewart W. Wilson, The Rowland Institute for Science, Research Memo RIS No. 27R, 2/9/86.
"Knowledge Growth in an Artificial Animal", Stewart W. Wilson, Rowland Institute for Science.
"Classifier Systems and the Animal Problem", Stewart W. Wilson, The Rowland Institute for Science.
"A critical Review of Genetic Algorithms", J. David Schaffer and John J. Grefenstette.
"Improving the Performance of Genetic Algorithms in Classifier Systems", L. B. Booker, Proc.
Intern. Conf. on Gen. Alg. and their Appl. Pittsburg, PA, Jul. 1985, pp. 80-92.
"Classifier Systems with Hamming Weights", L. Davis and D. K. Young, 3-31-88, pp. 1-12.

Primary Examiner—Jerry Smith
Assistant Examiner—Paul Gordon
Attorney, Agent, or Firm—Henry D. Pahl, Jr.

[57] ABSTRACT

The adaptive computing system disclosed herein employs a data structure involving a multiplicity of classifiers, each of which includes a match string of characters which the system attempts to match up with messages generated either by the environment or by other classifiers. Associated with each match string is a response message definer or action part which defines the response to be given when a match is obtained. To facilitate matching in a noisy or changing environment, there is associated with each character in the match string a weighting value and the degree of match is judged by means of a score value which is a function of the weighting values of the characters which match between the match string and the message.

10 Claims, 2 Drawing Sheets

```
Parent 1    0    I    0    I    0    I
            50   0   100   50  100   20

Parent 2    0    0    0    0    0    0
            50   0    30  100  200   0

X
                        |
Child 1     0    I    0    0    0    0
            50   0    30  100  200   0

Child 2     0    0    0    I    0    I
            50   00  100   50  100   20
```

FIG. 3

ADAPTIVE COMPUTING SYSTEM

BACKGROUND OF THE INVENTION

The present invention relates to adaptive computing stystems and more particularly to such systems which employ a data structure providing a multiplicity of so-called classifiers.

Classifier computing systems represent attempts to enable computers to perform inductive logic. Such systems are described in the context of inductive logic generally in a treatise entitled "Induction" written by John H. Holland et al. and published in 1986 by the MIT Press, Cambridge, Massachusetts. U.S. Pat. No. 4,697,242 entitled Adaptive Computing System Capable of Learning and Discovery was issued to John H. Holland and Arthur W. Burks on Sept. 29, 1987 and relates to a classifier-type computing system.

In general, classifier-type computing systems are set up to respond to a binary encoded input signal, typically comprising a succession of messages. It is the function of the classifier system to generate appropriate responses to the messages. In order for the classifier system to evolve or adapt, the environment or source must also provide a reinforcement signal, i.e. a reward, for good or appropriate responses.

As described by Holland as well as others in the field, the basic data structure of a classifier includes a match string, a response message or response message definer, and a strength value associated with the classifier. The match string is typically encoded in a ternary format in which each character may be a "1", a "0" (zero) or a "#". The "#" character designates a "don't care" condition. In the system described in the '242 patent, messages from both the environment and from classifiers are posted to a message list where, on sucessive cycles, they may be examined and attempted to be matched by the various classifiers.

In the Holland classifier system, as well as in most other classifier systems proposed heretofore, the match which must be obtained between a given match string and a posted message must be relatively exact. The only tolerance of which the system is capable is provided through the use of the ternary encoding system for the match string where a particular character may be given a don't care (#) value.

Depending on the type of problem which the classifier system is intended to deal with, reward or reinforcement may be either immediate or intermittent. Immediate reinforcement is, for example, appropriate where a solution to a Boolean problem is being sought. A system providing such immediate reinforcement is described in a paper by Stewart W. Wilson entitled "Classifier System Learning of A Boolean Function" RIS 27 r, The Rowland Institute For Science, Cambridge, MA, Feb. 9, 1986. The Holland classifier system on the other hand contemplates that reinforcement will be intermittent and must be distributed amongst a succession of classifiers which contributed to the rewarded end result. The '242 patent describes a "bucket brigade" algorithm for building the strength value of classifiers based upon their being active at the time of reinforcement. In addition, the data structure for the classifiers may include a tag which identifies the predecessor of a classifier contributing to the rewarded response.

In addition to rewarding useful classifiers, adaptive computing systems of this type also contemplate the periodic application of various genetic operators so that new classifiers will evolve. The genetic algorithms are applied to classifiers selected from the overall population of classifiers with a likelihood or statistical chance of selection based upon the strength of the classifier. By using a likelihood or stochastic selection process, a useful diversity is maintained in the population of classifiers. Among the known genetic operators typically applied to generate new classifiers from selected classifiers are a form of "mutation" in which random bits of the match string are altered in state. A second very important form of genetic operator is called "crossover" in which a pair of classifiers ("parents") are combined by splitting the match strings of both parent classifiers at a random position and exchanging parts to form two new "child" classifiers. Typically, the ("parents") are left in the population and the new classifiers ("children") replace classifiers which are deleted with a likelihood based on their having low strength values.

As indicated previously, most classifier systems disclosed heretofore are relatively intolerant with respect to determining whether a match exists. In systems in which the input may be somewhat noisy or subject to variation, this intolerance leads to a so-called "brittleness" which can lead to failure or anomalous results. A paper by Lashon B. Booker entitiled "Improving The Performance of Genetic Algorithms In Classifier Systems" Proc. Intern. Conf. on Gen. Alg. and Their Appl., Pittsburgh, PA, July 1985, 80–92 proposed two alternate methods of scoring the match to make the system somewhat more tolerant. In one approach, he proposed a match score, designated M3, which measured the Hamming distance between a message and a match string (called a "taxon"). The basic data structure of the classifier, however, was left unchanged.

In accordance with the present invention, the data structure of the classifier system is modified to include a weighting value for each bit in the match string. As each match string is compared with a posted message, a score value is generated by summing the weights associated with the matched bits. Thus, the system can accommodate messages in which the relative importance of various bits differ within the message. This is believed to be more in line with the problems encountered in real life situations. Further, by applying genetic operations to the weighting values as well as to the match string itself, the performance of successive evolutions of classifiers may be improved.

SUMMARY OF THE INVENTION

The method of the present invention is adapted to providing responses to a source of binary encoded input signal comprising a succession of messages, the source also providing a reinforcement signal for appropriate responses. Initially, a population of classifiers is generated, each of which includes a binary encoded match string of bits with a weighting value associated with each bit. Each classifier also includes a binary encoded response message definer and a strengthy value for the classifier.

The match string for each classifier is compared to each input signal message and a corresponding score value is generated which is a function of the weighting values of the matching bits. The score values generated by the different classifiers are compared and respective response messages are output for classifiers having the better scores. The strength value for each classifier whose output message was appropriate is modified as a function of the respective reinforcement signal. Periodically, genetic operations are applied to generate new classifiers based upon the modification of selected ones of the match strings and selected sets of weighting values, the selection process including a randomizing component and a component based on the respective strength values.

BRIEF DESCRIPTION OF THE DRAWINGS

FIG. 2 is a diagram illustrating the bit-weighted comparison of a match string with a posted message; and FIG. 3 is a diagram illustrating a genetic operation applied to a pair of bit-weighted match strings.

Corresponding reference characters indicate corresponding parts throughout the several views of the drawings.

DESCRIPTION OF THE PREFERRED EMBODIMENT

Figure 1:
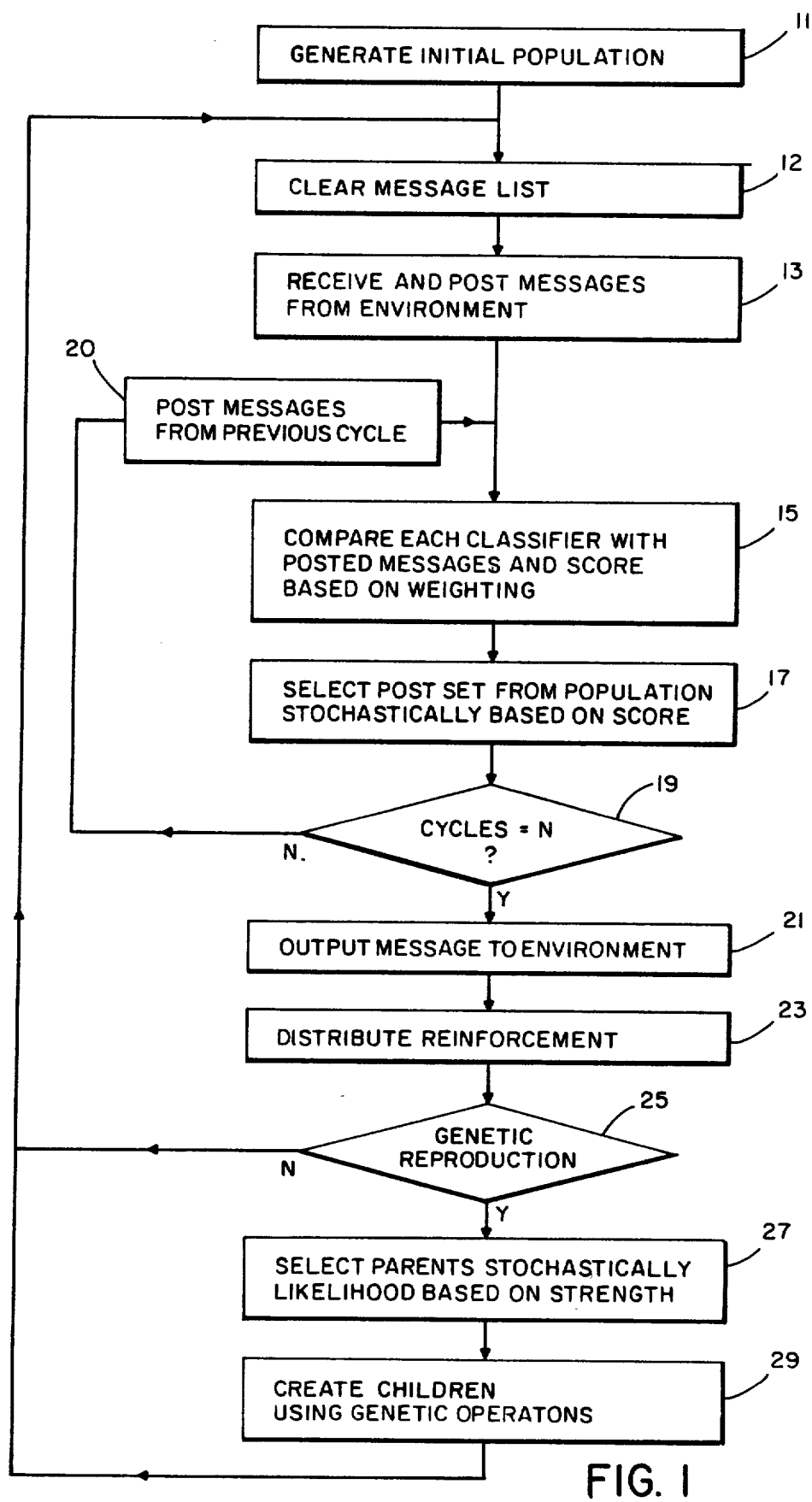
FIG. 1 is a flow chart of a classifier-type adaptive computing system employing bit-weighted match strings in accordance with the present invention.

As indicated previously, classifier sysems involve a data structure comprising a population of what are termed classifiers. If the classifier system is well designed in relation to the particular problem and is robust as opposed to brittle, the initial set of classifiers may be formed of randomly generated numbers or characters and the reward mechanism itself will cause the evolution of classifiers which are useful in providing appropriate responses to the environment. The step of generating such an initial population of classifers is designated by reference character 11 in FIG. 1. In accordance with the present invention, the classifiers generated include not only a match string but also a weighting value associated with each bit in the match string. As in the prior art systems, each classifier will also include a response message, or response message definer, and a strength value associated with the classifier. In systems where the classifiers themselves will post messages, the response message will be a bit string equal in length to the match string. However, in immediate reward, Boolean type systems, the response message may be a single bit. Initially, and after each major cycle, the message list is cleared. This step is represented by the block designated by reference character 12.

Once the initial population classifier is created, messages may be received from the environment and posted. This step is designated by reference character 13.

The match string from each classifier in the population is compared to each posted message and a score is generated based on the sum of the weights associated with the bits that match. This process is illustrated in FIG. 2 when the posted message is 010101 and the match string is all zeroes. The successive zeroes in the match string, however, have different weights associated with them as illustrated. Accordingly, the score generated depends not only upon which bits are matched but also the weights associated with those bits. Thus, although the number of bits matched is not high, at least one of the bit position, i.e. the fifth bit position, was considered highly important in the match string and thus the resultant score reflects that contribution. As indicated previously, this method of scoring corresponds much more realistically with any practical method of encoding a real world problem and is particularly useful when the environment may be noisy or subject to variation or when the effect of cumulative evidence is to be weighted. In FIG. 1, this comparing and scoring step is designated by reference character 15. While it is an advantage of the present invention that the match strings may be binary encoded, that is, it is not necessary to use the ternary encoding scheme postulated by Holland, it should also be understood that the weighting scheme of the present invention can also advantageously be used with other alphabets emloying larger numbers of characters.

After all of the classifiers in the population have been compared with each posted message and corresponding scores developed, a selection is made with the liklihood of selection being based upon the score in realtion to a match threshold. The match threshold will typically be a system wide value but, alternatively, it could be encoded as part of each classifier. As noted previously, selection is not based absolutely on score but, rather, the score increases the statistical likelihood of selection so that a healthy diversity is maintained in the population of classifiers. This selection process is represented by the flow chart block 17.

As in systems known heretofore, the selected classifiers are taxed, i.e. their strength is reduced by a preselectable proportion. This is sometimes referred to as a post tax. In order to foster a balanced evolution, it may also be useful to apply a periodic tax to prevent stagnant classifiers from remaining in the population even though they are not contributing to any reinforced or rewarded output message.

As indicated previously, classifier systems may utilize either immediate or deferred reinforcement depending upon the nature of the problem. If the reinforcement is deferred or intermittent, typically a succession of minor cycles will be performed within each major cycle, at which time an output or an effector message is produced to the environment. In FIG. 1, a mechanism for generating a fixed number of minor cycles is provided by the decision block designated by reference character 19. If the count of minor cycles is less than the number desired, messages are posted based upon the classifiers which were selected from the previous minor cycle, as represented at block 20, and the population of classifiers is compared with those messages. Once the desired number of minor cycles has been performed, a message may be output to the environment, as designated by reference character 21. If the problem is appropriate for immediate reinforcement, e.g. such as that described in the Wilson article identified previously, the internal loop set up by decision block 19 may be omitted. In other words, "N" may be considered to be equal to one. As indicated in the block designated by reference character 23, the reinforcement signal provided by the environment will be distributed to the classifiers which were active in providing the output message. Again, the particular manner in which reinforcement is generated and distributed will depend upon the type of problem to which the classifier system is being applied, similarly, while regular reinforcement may be availale in some situations or problems, classifier systems may also be arranged to accept intermittent reinforcement.

A decision block for the application of genetic operations is designated by reference character 25. However, assuming that it is not time for the application of any genetic operation, the program returns to the steps 12 & 13 where the message list is cleared and messages can again be received from the environment. Repeatedly circling the loop thus far described will cause useful classifiers to grow in strength where less useful classifiers will become relatively weaker. However, as is understood by those skilled in the art, the real power of classifier systems arises through the use of genetic operations which allow new classifiers to evolve from the initial population. How often such genetic operations are applied will of course depend upon the design of the system and the particular problem. This count or decision is thus one of the design parameters of the system. When a sufficient number of passes through the reinforcement loop have taken place, control is passed, by decision block 25, to the block designated 27 which encompasses the selection of classifiers as the subjects for the performing of genetic operations. The selection process is performed, as in the prior art, as a stochastic process, with likelihood of selection being based on the respective strength value. In other words, the selection process includes both a randomizing component and a component based on the strength value. An alternative method of selecting parents is to select stochastically with likelihood based not only on strength but also on the distance between possible pairs of prospective parents, the distance being computed on the basis of the weighting of the matching and non-matching bits.

In accordance with the present invention, genetic operations are performed on the weight values associated with each of the bits in the match string as well as upon the match string itself. The process is represented in FIG. 1 by the block designated by reference character 29. The genetic operations performed on the weights may be performed in conjunction with those on the match string or may be performed independently thereof. FIG. 3 represents the application of a powerful crossover genetic operator applied in coordinated fashion to both the match string and the associated weight values. In this example, parent 1 comprises the match string 010101 and parent 2 comprises a match string which is all zeroes. A crossover point is determined at random. In the example illustrated in FIG. 3, the crossover point is assumed to be between the second and third bit positions. It should be understood that multiple crossover points, also chosen at random, may be usefully implemented particularly with longer match strings. With reference to FIG. 2, the combining with crossover yields two children of the parents, one with the match string 010000 and the other with the match string 000101. In each case in the illustrated example, the weight value associated with each bit of the child string is taken from the same parent which produced the match bit. An alternative, however, would be to average the weights from the two parents for each bit position. As is understood by those skilled in the art, this sort of crossover genetic operation provides a chance for the generation of new classifiers which combine useful aspects of two different parent classifiers. As indicated previously, the selection of parents is performed as a stochastic process with the likelihood of selection being based on the relative strength of the various classifiers. On the other hand, since the stochastic process includes a random component, a healthy diversity in the overall population is maintained.

As indicated previously, the weight values associated with individual bits in the match string may also be mutated on a random or statistical basis, that is, an individual weight may be substituted with a random number between zero and the maximum weight value. This is somewhat analogous to the mutation previously applied to bits in the match string itself.

Another genetic operation uniquely applicable to the weight values is a so-called strengthen signal operation. In this operation, individual weights on a classifier may be moved to higher or lower values depending whether they are tending towards the high or low part of the value range. A further way of perturbing the weighting values may be to cause them to creep in value, i.e. move incrementally in value up or down. Again, this would be a stochastic process applied in a somewhat random fashion to allow new variants of the classifiers to evolve and to then be rewarded and strengthened should they prove useful to the environment.

In the examples shown in FIGS. 2 and 3, the individual weights have been allowed to reside anywhere in a range between zero and predetermined maximum, e.g. 200. In some instances, it may also be useful to justify or normalize the weight values so that the sum of the weights always equals a constant. Such a normalization would be applied after an operation such as crossover, mutation or strengthen signal to readjust all of the weights to normalized values.

Summarizing, it can be seen that the weighting method of the present invention yields a classifier system which is more tolerant or accommodating of real world problems in which the input signal may be noisy or subject to variation. Further, the utilization of weighting values associated with the different bits of the match string allows the employing of new and useful genetic operators for the generation of successor classifiers which will gradually replace the original population. The advantages of a classifier system with weights associated with the bits of the match string to particular classes of problems is described in a paper entitled "Classifier Systems With Hamming Weights" being given by Lawrence Davis and David K. Young at the Fifth International Conference On Machine Learning at Ann Arbor, Michigan, on Jun. 12, 1988. This paper is attached as an Appendix to this application and its disclosure is incorporated herein by reference.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A method of generating responses to a source of an input signal comprising a succession of messages, said source providing a reinforcement signal for good responses, said method comprising:

initially generating a population of classifiers, each classifier comprising;
   a match string;
   for each character in the match string, a weighting value;
   a response message definer; and
   a strength value for the classifier;
   for successive input signal messages performing the steps of:
   comparing the match string of each classifier to each successive input signal message provided by the source and generating a corresponding score value which is a function of the weighting values of the matching characters;

comparing the score values generated by the different classifiers;

outputting respective response messages for classifiers selected stochastically on a basis favoring those classifiers having the better scores; and modifying, as a function of a received reinforcement signal, the strength values for classifiers whose response messages were appropriate.

2. A method as set forth in claim 1 further comprising applying genetic operations to generate new classifiers based upon the modification of selectd ones of said match strings and selected sets of weighting values.

3. A method as set forth in claim 2 wherein said genetic operation comprises a crossover operation in which a new classifier has some weights taken from one pre-existing classifier and other weights taken from another pre-existing classifier.

4. A method as set forth in claim 2 wherein said genetic operation comprises a crossover operation in which a new classifier has some characters and associated weights taken from one pre-existing classifier and other characters and associated weights taken from another pre-existing classifier.

5. A method as set forth in claim 2 wherin a pair of classifiers are selected for combining, the selection being based on a distance between the classifiers which is calculated as a function of the weighting values associated with the matching and non-matching characters in each pair considered.

6. A method of generating responses to a source of a binary encoded input signal comprising a successive of messages, said source providing a reinforcement signal for good responses, said method comprising:

initially generating a population of classifiers, each classifier comprising;
a binary encoded match string of bits;
for each bit in the match string, a weighting value;
a binary encoded response message definer; and
a strength value for the classifier;

for successive input signal messages performing the steps of:

comparing the match string of each classifier to each successive input signal message provided by the source and generating a corresponding score value which is a function of the weighting values of the matching bits;

comparing the score values generated by the different classifiers;

outputting respective response messages for classifiers selected stochasically on a basis favoring those classifiers having the better scores;

modifying, as a function of a received reinforcement signal, the strength values for classifiers whose response messages were appropriate; and periodically applying genetic operations to generate new classifiers based upon the modification of selected ones of said match strings and selected sets of weighting values, the selection process including a randomizing component and a component based on the respective strength values of the classifiers.

7. A method as set forth in claim 6 wherein the response messages are binary encoded strings equal in length to the match strings.

8. A method as set forth in claim 7 wherin, between successive input signal messages, a succession of cycles are performed in which the match strings of all classifiers are compared to the response messages which were output during previous cycles.

9. A method as set forth in claim 6 wherein said genetic operation comprises a crossover operation in which a new classifier has some bits and associated weights taken from one pre-existing classifier and other bits and associated weights taken from another pre-existing classifier.

10. A method as set forth in claim 9 wherein a pair of classifiers are selected for crossover, the selection being based on a distance between the classifiers which is calculated as a function of the weighting values associated with the matching and non-matching bits in each pair considered.

* * * * *

UNITED STATES PATENT AND TRADEMARK OFFICE
CERTIFICATE OF CORRECTION

PATENT NO. : 4,961,152

DATED : October 2, 1990

INVENTOR(S) : Lawrence Davis

It is certified that error appears in the above-identified patent and that said Letters Patent is hereby corrected as shown below:

Column 2, line 59, "strengthy" should be --strength--.

Column 3, line 62, "position" (first occurrence), should be --positions--.

Claim 6, Column 7, line 33, "successive" should be --succession--.

Signed and Sealed this

Seventeenth Day of March, 1992

Attest:

HARRY F. MANBECK, JR.

*Attesting Officer*   *Commissioner of Patents and Trademarks*